(12) United States Patent
Chang et al.

(10) Patent No.: US 9,251,579 B2
(45) Date of Patent: Feb. 2, 2016

(54) SYSTEM AND METHOD FOR MEASURING IMAGES OF OBJECT

(75) Inventors: Chih-Kuang Chang, New Taipei (TW); Zhong-Kui Yuan, Shenzhen (CN); Zhi-Jun Zou, Shenzhen (CN); Zheng-Cai She, Shenzhen (CN); Xiao-Guang Xue, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 556 days.

(21) Appl. No.: 13/598,776

(22) Filed: Aug. 30, 2012

(65) Prior Publication Data

US 2013/0089238 A1 Apr. 11, 2013

(30) Foreign Application Priority Data

Oct. 10, 2011 (CN) .......................... 2011 1 0304464

(51) Int. Cl.
*G06K 9/62* (2006.01)
*G06T 7/00* (2006.01)

(52) U.S. Cl.
CPC ........... *G06T 7/0004* (2013.01); *G06T 2200/24* (2013.01); *G06T 2207/30141* (2013.01)

(58) Field of Classification Search
CPC ........................................................ G06K 9/62
USPC ........................................................ 382/106
See application file for complete search history.

(56) References Cited

U.S. PATENT DOCUMENTS

| | | | | |
|---|---|---|---|---|
| 8,199,805 | B2 * | 6/2012 | Numata et al. | 375/240 |
| 2010/0020225 | A1 * | 1/2010 | Hosoi et al. | 348/333.12 |
| 2010/0220928 | A1 * | 9/2010 | Iwabuchi et al. | 382/190 |

* cited by examiner

*Primary Examiner* — Nirav G Patel
*Assistant Examiner* — Delomia Gilliard
(74) *Attorney, Agent, or Firm* — Novak Druce Connolly Bove + Quigg LLP

(57) ABSTRACT

A computing device reads an entire image of an object. The entire image is spliced by a plurality of part images. A user selects an area on the entire image. The computing device determines a first number of first pixel points between a center point of the selected area and a center point of each covered image. The converted images are part images that the selected area covers. The coordinate values of the center point of the selected area are calculated according to the first number of pixel points and a size of each pixel point of the entire image. The computing device calculates coordinate values of each point of a selected area according to the size of each pixel point and the coordinate values of the center point of the selected area.

12 Claims, 4 Drawing Sheets

SYSTEM AND METHOD FOR MEASURING IMAGES OF OBJECT

BACKGROUND

1. Technical Field

Embodiments of the present disclosure relate to image management systems and methods, and particularly to a system and a method for measuring images of an object.

2. Description of Related Art

A video measuring system (VMS) is used for scanning an object to obtain images of the object. If the object is too large, the VMS may only scan a portion of the object at one time and obtain a number of separate images of the object. If a user wants to analyze characteristics of surfaces of the object as a whole, the separate images are not helpful for the user. Therefore, there is a need for improvement in the art.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
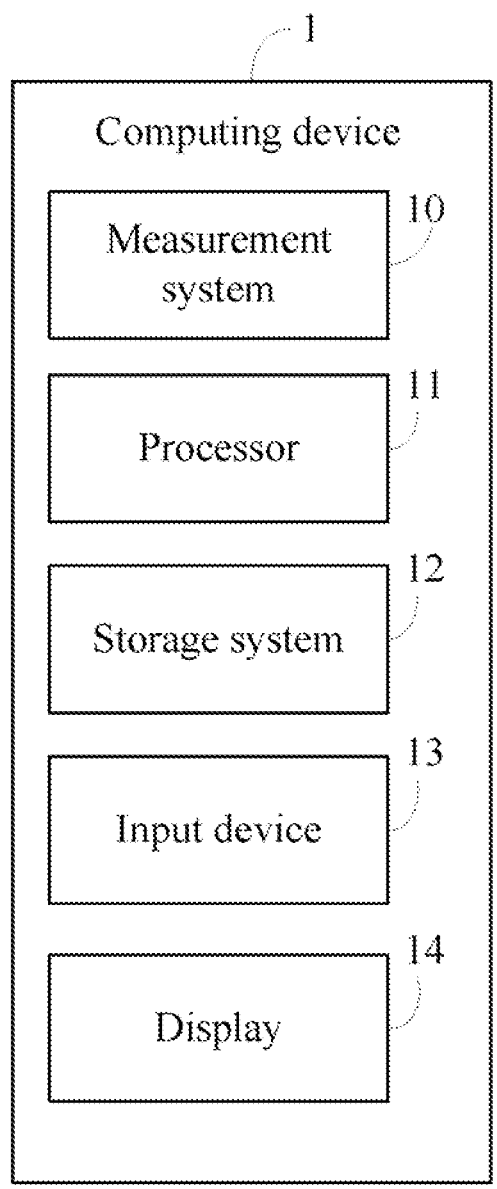
FIG. 1 is a block diagram of one embodiment of a computing device comprising a measurement system.

FIG. 1 is a block diagram of one embodiment of a computing device 1 including a measurement system 10, an input device 13 and a display 14. The input device 13 may be a keyboard or a mouse, for example. The display 14 displays measurement tools and features of the object. In some embodiments, the features of the object may include points, lines, or circles, for example. The measurement tools may include tools for checking points manually, checking lines manually and checking points automatically, for example. In an exemplary embodiment, the computing device 1 includes at least one processor 11 and a storage system 12. The measuring system 10 may include one or more modules (also described in FIG. 2). The one or more modules may comprise computerized code in the form of one or more programs that are stored in the storage system 12. In one embodiment, the storage system 12 may be a magnetic storage system, an optical storage system, or other suitable storage medium. The computerized code includes instructions that are executed by the at least one processor 11 to provide functions for the one or more modules described below. The storage system 12 stores an entire image of the object.

The entire image is spliced by more than one part image of the object. Each part image is an image of a portion of the object. The storage system 12 further stores information of the entire image of the object. The information includes information of a center point of each part image, a size of the entire image, a size of each pixel point of the entire image, and a resolution of the entire image. In one embodiment, the information of the center point of each part image may include coordinate values of the center point. The size of each pixel point of the entire image includes a size on X-axis and a size on Y-axis.

Figure 2:
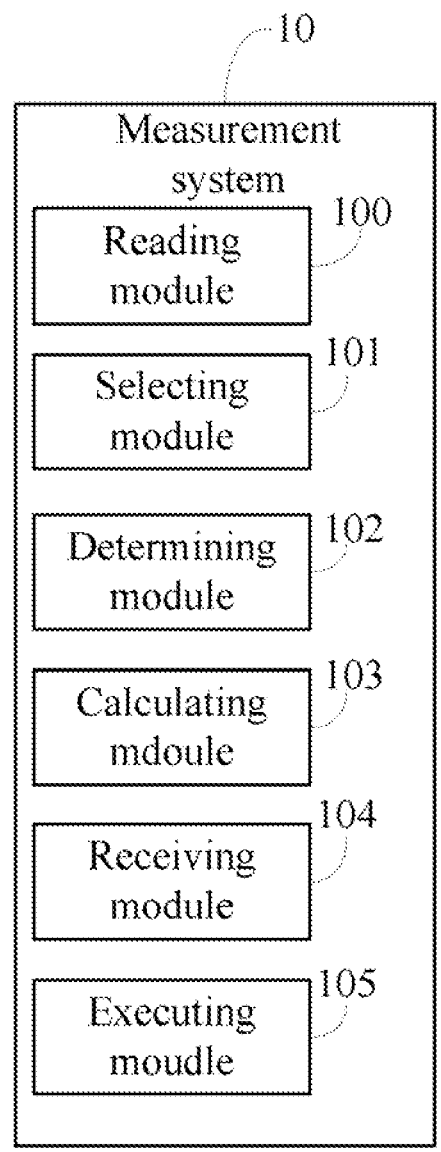
FIG. 2 is a block diagram of one embodiment of the function modules of the measurement system in FIG. 1.

As shown in FIG. 2, the measuring system 10 includes a reading module 100, a selecting module 101, a determining module 102, a calculating module 103, a receiving module 104 and an executing module 105.

Figure 4:
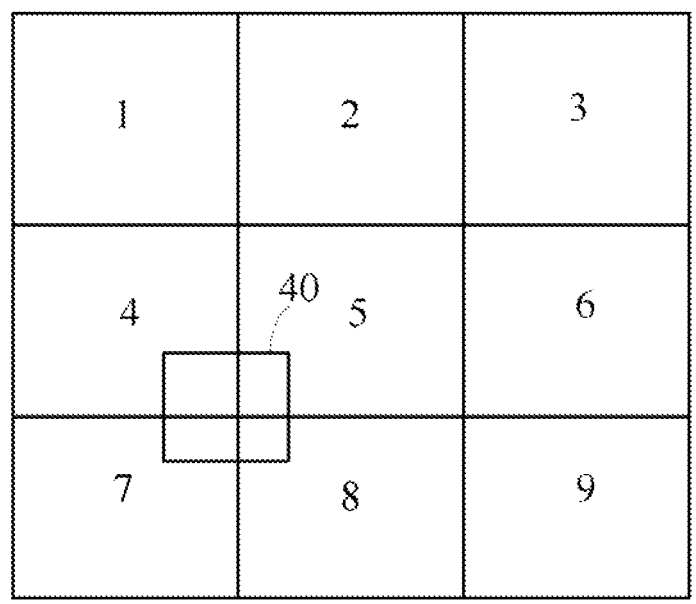
FIG. 4 shows one embodiment of splicing images of an object.

The reading module 100 reads the entire image of the object and the information of the entire image from the storage system 12. As shown in FIG. 4, the entire image of the object is spliced by nine pieces of part images. The reading module 100 reads the information of each part image.

The selecting module 101 receives a selected area of the entire image, determines a center point of the selected area, and determines areas of the part images that the selected area covers. In one embodiment, the measuring system 10 provides an interface on the display 14. The interface displays a navigation window and a display window. The navigation window displays the entire image of the object. The user can select the selected area on the navigation window by the input device 13. The selected area is displayed on the display window. On the display window, the center point of the selected area is marked. As shown in FIG. 4, the selected area 40 is selected by the selecting module 101.

The determining module 102 determines a first number of first pixel points between the center point of the selected area and a center point of each part image that the selected area covers (hereinafter, each "covered image") according to a resolution of the entire image, the information of the center point of the selected area, and the information of the center points of the images which the selected area covers. The first number of the pixel points includes the pixel points on X-axis and on Y-axis.

The calculating module 103 calculates coordinate values of the center point of the selected area according to the size of each first pixel point and each first number of the first pixel points between the center point of the selected area and a center point of each covered image. In one embodiment, the calculating module 103 calculates first coordinate values of the center point of the selected area corresponding to each covered image. Then the calculating module 103 calculates average values of the first coordinate values corresponding to each covered image as the coordinate values of the center point of the selected area.

For example, as shown in FIG. 4, the selected area 40 covers the image 4, 5, 7 and 8. The center point of the image 4 is c4(x4, y4). The center point of the image 5 is c5(x5, y5). The center point of the image 7 is c7(x7, y7). The center point of the image 8 is c8(x8, y8). The calculating module 103 calculates the first coordinate values of the center point of the selected area corresponding to the center point c5(x5, y5) by using formulas "x5−M1*N" and "y5−M2*N." The "M1" is the size of each pixel point on X-axis. The "M2" is the size of each pixel point on Y-axis. The "N" is a number of pixel points between the center point of the selected area and the center point c5(x5, y5). As the same as calculating the first coordinate values of the center point of the selected area corresponding to the center point c5(x5, y5), the calculating module 103 calculates the first coordinate values of the center point of the selected area corresponding to the center points c4(x4, y4), c7(x7, y7) and c8(x8, y8) respectively. Finally the calculating module 103 calculates the average values of all the first coordinate values as the coordinate values of the center point of the selected area.

The receiving module 104 receives measurement tools and a feature to be measured selected on the display 14 by the user.

The executing module 105 determines a second number of second pixel points between each point of the selected feature of the object and the center point of the selected area. The executing module 105 further calculates coordinate values of each point of each selected feature according to the second number, the size of each pixel point, and the coordinate values of the center point of the selected area.

Figure 3:
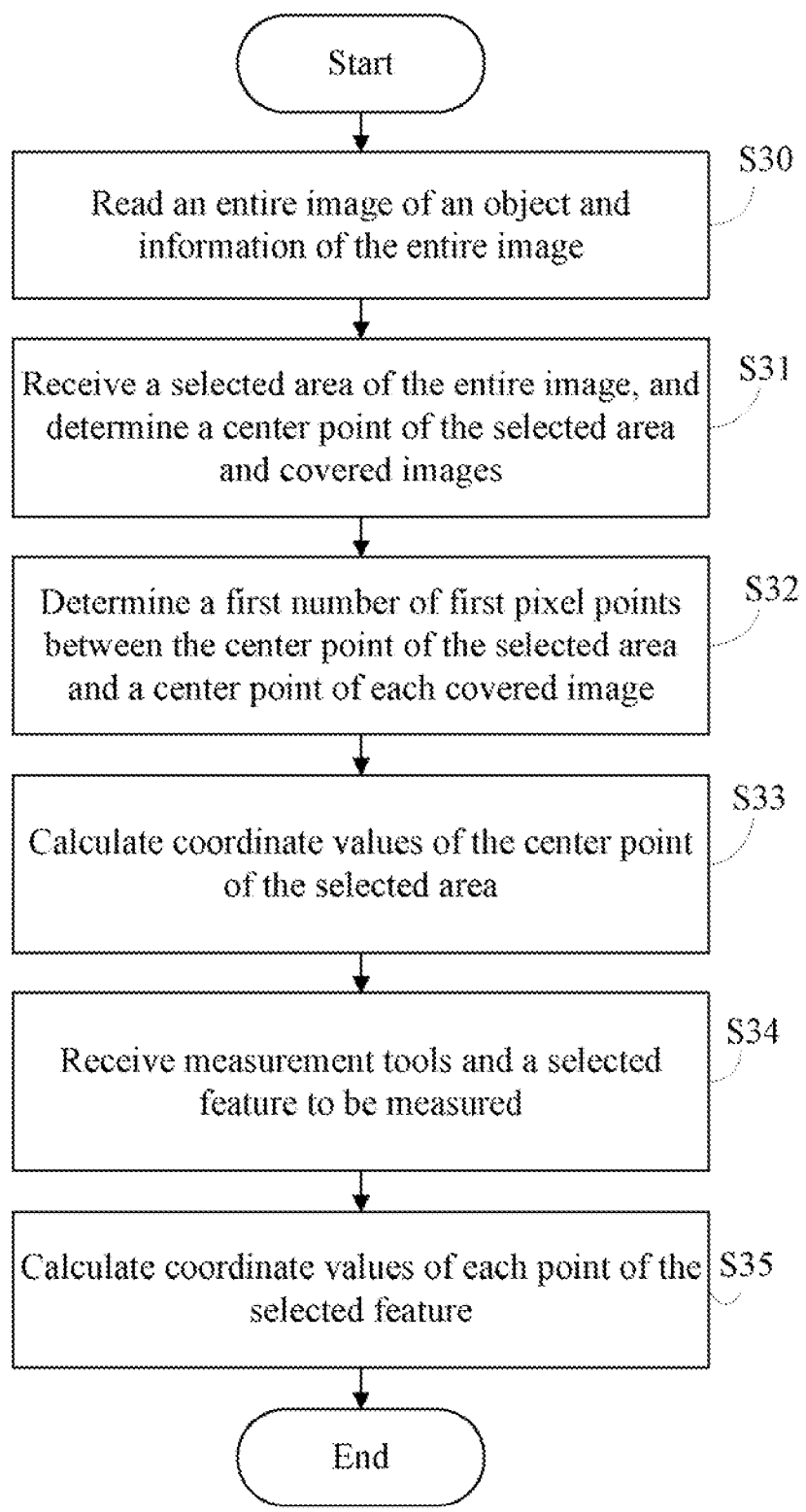
FIG. 3 is a flowchart illustrating one embodiment of a method for measuring images of an object.

FIG. 3 is a flowchart illustrating a method for measuring images of an object. Depending on the embodiment, additional steps may be added, others removed, and the ordering of the steps may be changed.

In step S30, the reading module 100 reads the entire image of the object and the information of the entire image from the storage system 12.

In step S31, the selecting module 101 receives a selected area of the entire image, and determines a center point of the selected area and areas of the part images that the selected area covers.

In step S32, the determining module 102 determines a first number of first pixel points between the center point of the selected area and a center point of each covered image according to a resolution of the entire image, the information of the center point of the selected area, and the information of the center points of the images which the selected area covers.

In step S33, the calculating module 103 calculates coordinate values of the center point of the selected area according to the size of each first pixel point and each first number of the pixel points between the center point of the selected area and a center point of each covered image.

In step S34, the receiving module receives measurement tools and a feature to be measured, selected by the user.

In step S35, the executing module 105 determines a second number of second pixel points between each point of the selected feature of the object and the center point of the selected area, and calculates coordinate values of each point of each selected feature according to the second number, the size of each pixel point, and the coordinate values of the center point of the selected area.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
   a storage system;
   at least one processor; and
   one or more programs being stored in the storage system and when executed by the at least one processor, cause the at least one processor to:
   read information related to an entire image of an object, which is spliced using more than one part image of the object, from the storage system, wherein the information of the entire image comprises a size of each pixel point of the entire image;
   determine a first number of first pixel points between a center point of a selected area and a center point of each covered image according to the information of the entire image, wherein the covered image is a part image that is covered by the selected area;
   calculate coordinate values of the center point of the selected area according to the size of each first pixel point and each first number of the first pixel points between the center point of the selected area and a center point of each covered image;
   receive measurement tools and a selected feature on the entire image; and
   determine a second number of second pixel points between each point of the selected feature and the center point of the selected area, and calculate coordinate values of each of the points of the selected feature according to the second number of the second pixel points, the size of each second pixel point, and the coordinate values of the center point of the selected area.

2. The computing device as described in claim 1, wherein the information of the entire image further comprises information of the center point of each part image, a size of the entire image, and a resolution of the entire image.

3. The computing device as described in claim 1, wherein the size of each pixel point includes a size on an X-axis and a size on a Y-axis.

4. The computing device as described in claim 1, wherein the selected feature is selected from a group consisting of a point, a line, and a circle.

5. A computing device-based method for measuring images of an object, comprising:
   reading information related to an entire image of an object by a computing device, the entire image being spliced using more than one part image of the object, from a storage system of the computing device, wherein the information of the entire image comprises a size of each pixel point of the entire image;
   determining a first number of first pixel points between a center point of a selected area and a center point of each covered image by the computing device according to the information of the entire image, wherein the covered image is a part image that is covered by the selected area;
   calculating coordinate values of the center point of the selected area according to the size of each first pixel point and each first number of the first pixel points between the center point of the selected area and a center point of each covered image;
   receiving measurement tools and a selected feature on the entire image; and
   determining a second number of second pixel points between each point of the selected feature and the center point of the selected area, and calculating coordinate values of each of the points of the selected feature according to the second number of the second pixel points, the size of each second pixel point, and the coordinate values of the center point of the selected area.

6. The method as described in claim 5, wherein the information of the entire image further comprises information of the center point of each part image, a size of the entire image, and a resolution of the entire image.

7. The method as described in claim 5, wherein the size of each pixel point includes a size on an X-axis and a size on a Y-axis.

8. The method as described in claim 5, wherein the selected feature is selected from a group consisting of a point, a line, and a circle.

9. A non-transitory storage medium having stored thereon instructions that, when executed by a processor, cause the processor to perform a method for measuring images of an object, the method comprising:

reading information related to an entire image of an object, which is spliced using more than one part image of the object, wherein the information of the entire image comprises a size of each pixel point of the entire image;

determining a first number of first pixel points between a center point of a selected area and a center point of each covered image according to the information of the entire image, wherein the covered image is a part image that is covered by the selected area;

calculating coordinate values of the center point of the selected area according to the size of each first pixel point and each first number of the first pixel points between the center point of the selected area and a center point of each covered image;

receiving measurement tools and a selected feature on the entire image; and determining a second number of second pixel points between each point of the selected feature and the center point of the selected area, and calculating coordinate values of each of the points of the selected feature according to the second number of the second pixel points, the size of each second pixel point, and the coordinate values of the center point of the selected area.

10. The non-transitory storage medium as described in claim 9, wherein the information of the entire image further comprises information of the center point of each part image, a size of the entire image, and a resolution of the entire image.

11. The non-transitory storage medium as described in claim 9, wherein the size of each pixel point includes a size on an X-axis and a size on a Y-axis.

12. The non-transitory storage medium as described in claim 9, wherein the selected feature is selected from a group consisting of a point, a line, and a circle.

* * * * *